US012414215B2

(12) United States Patent
Tanase et al.

(10) Patent No.: US 12,414,215 B2
(45) Date of Patent: Sep. 9, 2025

(54) MODULAR POST WITH A FUNCTIONAL POLE MODULE

(71) Applicant: Schreder S.A., Brussels (BE)

(72) Inventors: Cristian Tanase, Carnaxide (PT); Ricardo Janeiro, Carnaxide (PT); Daniel Sousa, Carnaxide (PT)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/262,111

(22) PCT Filed: Jan. 19, 2022

(86) PCT No.: PCT/EP2022/051148
§ 371 (c)(1),
(2) Date: Jul. 19, 2023

(87) PCT Pub. No.: WO2022/157203
PCT Pub. Date: Jul. 28, 2022

(65) Prior Publication Data
US 2024/0080958 A1 Mar. 7, 2024

(30) Foreign Application Priority Data
Jan. 19, 2021 (NL) ...................................... 2027349

(51) Int. Cl.
*H05B 47/19* (2020.01)
*F21S 8/08* (2006.01)
*F21V 33/00* (2006.01)

(52) U.S. Cl.
CPC .............. *H05B 47/19* (2020.01); *F21S 8/085* (2013.01); *F21V 33/0052* (2013.01)

(58) Field of Classification Search
CPC ....... F21S 8/085; F21S 2/005; F21V 33/0052; F21V 23/00; F21V 23/0435; H05B 47/19
See application file for complete search history.

(56) References Cited

U.S. PATENT DOCUMENTS 7,663,498 B2 * 2/2010 Lafaye ...................... F21S 8/00 340/691.1
8,558,413 B1 * 10/2013 Lepard .................. H05B 47/18 307/157

(Continued)

FOREIGN PATENT DOCUMENTS

EP 3366978 A1 8/2018

OTHER PUBLICATIONS

PCT International Search Report and Written Opinion, PCT Application No. PCT/EP2022/051148, mailed May 6, 2022, 11 pages.

*Primary Examiner* — William N Harris
(74) *Attorney, Agent, or Firm* — McDonnell Boehnen Hulbert & Berghoff LLP

(57) ABSTRACT

A modular post comprising a plurality of pole modules arranged one above the other along a central axis, said pole modules comprising a functional pole module for receiving and/or transmitting signals; said functional pole module comprising: a housing comprising a lower, middle, and upper sections; a functional unit comprising a wireless communication means, and a power and data interface configured for being connected to a power source and to the wireless communication means, for powering the wireless communication means, for powering another functional unit of another functional pole module, and for transmitting and/or receiving data to/from the another functional unit; wherein the lower section comprises a coupling interface for coupling the functional pole module to another pole module located below along the central axis, and/or wherein the upper section comprises a coupling interface for coupling the functional pole module to another pole module located above along the central axis.

17 Claims, 11 Drawing Sheets

(56) References Cited

U.S. PATENT DOCUMENTS

| | | | | |
|---|---|---|---|---|
| 9,899,773 | B2 * | 2/2018 | Elia | H01R 13/639 |
| 9,941,736 | B1 * | 4/2018 | Ellingboe | H01R 13/447 |
| 10,317,029 | B2 * | 6/2019 | Papoular | G08B 5/36 |
| 10,429,047 | B2 * | 10/2019 | Galloppa | F21S 2/005 |
| 11,149,926 | B2 * | 10/2021 | Stegeman | H05B 47/11 |
| 11,683,625 | B2 * | 6/2023 | Kaiser | H05B 47/12<br>381/355 |
| 11,802,670 | B2 * | 10/2023 | Pretorius | F21V 21/10 |
| 2006/0044789 | A1 * | 3/2006 | Curtis | G08B 13/19632<br>362/153.1 |
| 2012/0143383 | A1 * | 6/2012 | Cooperrider | F21S 8/086<br>700/295 |
| 2020/0264088 | A1 * | 8/2020 | Bentley | G01N 15/06 |
| 2020/0278096 | A1 * | 9/2020 | Pereira | F21S 8/085 |

* cited by examiner

MODULAR POST WITH A FUNCTIONAL POLE MODULE

FIELD OF INVENTION

The field of the invention relates to modular posts, preferably lamp posts, in particular modular posts implemented in outdoor locations. Particular embodiments relate to the field of modular lamp posts comprising a number of functional pole modules such as a camera pole module. Other embodiments relate to a functional pole module for use in such modular posts, and to networks of modular posts.

BACKGROUND

EP 3 076 073 B1 in the name of the applicant discloses a modular lamp post which is readily assembled and installed in the field whilst providing rigidity, structural integrity and sealing. The modular lamp post comprises a plurality of pole modules mounted on a support pole. The pole modules are connected to one another by respective pole module connectors and one pole module thereof is connected to the support pole by a pole module connector. EP 3 076 073 B1 is included herein by reference.

Further it is known to include additional functionalities, either in the modular lamp post itself or in a separate cabinet adjacent a lamp post. Examples of such modular lamp posts are disclosed in WO 2019/043045 A1, WO 2019/043046 A1, WO2019/053259 A1, WO2020/152294 and PCT/EP2020/082269 in the name of the applicant. An example with a camera pole module is disclosed in WO 2019/092273 A1 in the name of the applicant. WO 2019/092273 A1 discloses a lamp post comprising a plurality of pole modules arranged one above the other along a vertical axis. The plurality of pole modules comprises a light pole module with a light source and a camera pole module. The camera pole module comprises a tubular portion configured for being aligned with the vertical axis of the support pole, a bracket protruding outwardly of said tubular portion, and a camera unit fixed to said bracket. Although using pole modules is advantageous for certain applications since they offer great flexibility in assembling a post with a tailored set of functions, such embodiments may have the disadvantage that the cabling from and to the different pole modules is rendered difficult, and some pole modules may benefit from additional protection at the cabling level (such that the connected functional unit has a high ingress protection rating, e.g. IP66).

SUMMARY

The object of embodiments of the invention is to provide a modular post with an improved functional pole module, providing good protection between the functional units and the pole module inner parts, as well as functional pole module allowing for a more user-friendly cabling.

According to a first aspect of the invention, there is provided a modular post, preferably a lamp post. The modular post comprises a plurality of pole modules arranged one above the other along a central axis of the modular post. The plurality of pole modules comprises a functional pole module for receiving and/or transmitting signals. The functional pole module comprises: a housing comprising a lower section, a middle section, and an upper section; a functional unit comprising a wireless communication means and a power and data interface configured to be connected to a power source and to the wireless communication means. The power and data interface is configured for powering the wireless communication means, for powering another functional unit of another functional pole module, and for transmitting and/or receiving data to/from the another functional unit. The lower section of the housing comprises a coupling interface configured for mechanically coupling the functional pole module to another pole module of the plurality of pole modules located below along the central axis. Additionally or alternatively, the upper section of the housing comprises a coupling interface configured for mechanically coupling the functional pole module to another pole module of the plurality of pole modules located above along the central axis.

By providing a power and data interface between the another functional unit and the functional unit, the powering of the another functional pole module becomes possible. In some embodiments the power provided to the another function unit may be directly controlled from the functional unit. For example, the functional pole module may control the powering of the another functional pole module based on data received by the wireless communication means. Also, by using the power and data interface, data can also be exchanged with the another functional unit and there is a direct connection to the wireless communication means to relay data wirelessly to another communication point of a connected network. Depending on the number of pole modules, the power and data interface may serve for powering and for transmitting and/or receiving data to/from multiple other functional units. In some embodiments, the overall length of cables within the modular posts can be reduced which in turn makes for a more user-friendly cabling. Also, by lowering the overall density of cabling within the modular post, it is easier to perform maintenance since it becomes easier to find a wanted cable.

It is noted that both the lower and the upper section of the housing may also be provided with a coupling interface configured to connect the functional pole module to a lower and upper pole module, e.g. another functional pole module or a cover module. This has the advantage that the functional pole module can be installed at any height within the modular post. However, in other embodiments, e.g. where the functional pole module is always used as the uppermost module of the modular post, the upper section may be a closed upper section. In another exemplary embodiment, the modular post may be attached to a support such as a wall, and the functional pole module may be a floating lowermost module.

According to a preferred embodiment, the lower section, and/or optionally the upper section, of the housing is configured for allowing the functional pole module to be rotated about the central axis; and, optionally, for fixing a position of the function pole module relative to the central axis.

In this way, the functional pole module may be oriented to a position facilitating the functioning of the functional unit, and in particular of the wireless communication means. It is to be noted that the coupling interface of the lower section and/or the upper section may be implemented such that the functional pole module can be rotated to any position within a 360°-range in a continuous manner, and fixed in that position.

According to an exemplary embodiment, the power and data interface comprises a power input connector configured to be connected to a power line, e.g. a DC power line, and a power and data connector configured to be connected to a power and data line for connecting the another functional pole module. Further the power and data interface comprises circuitry for powering the wireless communication means and the power and data connector, using the power on the power input line. For example the power and data interface may have a low power input connector connected to a DC power line, e.g. a 24V DC-bus line, and a Power-over-Ethernet connector connected to an Ethernet cable for being connected to the another functional unit. Optionally control circuitry may be provided to control the powering of the power and data connector using the power on the power input line. However, in other embodiments the power on the power input line may be used as such for powering the another functional module.

According to an exemplary embodiment, the another functional unit comprises any one of the following: a sensing means, a communicating means such as a WiFi access point or a base unit, a Human-Interface Device, a signaling means, a processing means.

Especially devices which have to deal with large amounts of data that is to be transmitted or received can benefit from being connected to the power and data interface of the functional unit with the wireless communication means.

Preferably, the another functional unit comprises any one or of the following: a camera unit, a laser device, a display, a radar device, a microphone, an antenna, a movement detector, a light emitting device such as an ultraviolet (UV) light or an infrared (IR) light or a light for light fidelity (Li-Fi) communication, a panic button, a pollution sensor, a visibility sensor, a sound sensor, a temperature sensor, a spraying/sanitizing device. More generally, the functional unit may be any kind of sensor means, communicating means, signaling means, Human Interface Device and/or receiving means. It is noted that there may be multiple functional units mounted on the same or different pole modules, and the multiple functional units may be the same or different. Some functional units may emit signals containing information. For example, in case of a laser unit, a laser beam may be projected on the ground, and the laser beam may be controlled such that information is displayed on the ground or in the sky. For example, in case of a microphone, audio or speech information may be emitted.

The skilled person will understand that, depending on the nature of the another functional unit, supplied power and data transmitted and/or received by the another functional unit via the power and data interface will be adapted to the another functional unit. For example, the data transmitted to the another functional unit may be control data to configure the another functional unit; the data may also be data collected by a sensing means of the another functional unit and received by the wireless communication means to be relayed; the data may also be a message transmitted to the another functional unit to be emitted by a signaling means.

According to a preferred embodiment, the another functional pole module comprises a camera pole module, and the another functional unit of the camera pole module comprises a camera unit.

In this manner, data collected by the camera unit may be regularly transmitted via the wireless communication means which relieves the data storing burden of the camera unit. The skilled person will understand that this idea can be equally applied to any functional unit generating a substantially large amount of data. The power and data interface may also transmit data from the wireless communication means to the camera unit, e.g. for parametrizing purposes.

According to an exemplary embodiment, the wireless communication means is powered by a Power-over-Ethernet (PoE) device having a power input receiving input power, e.g. a DC voltage, via a power line and having a PoE output connected to the wireless communication means.

In this way, power can be supplied and/or data can be transmitted to and/or received from the wireless communication means using the same line which simplifies the cabling. The Power-over-Ethernet device may be located in the same pole module as the wireless communication means, i.e. the functional pole module, or may be located in another location of the modular post, e.g. a support pole of the module post, another pole module. The Power-over-Ethernet device may be supplied in power by a 24V DC-bus line.

According to a preferred embodiment, the modular post further comprises a support pole for supporting the plurality of pole modules.

Preferably the support pole is fixed in the ground to secure the modular post stability. The support pole may be hollow and cabling to large infrastructure installations, e.g. connections to mains power supply and to a network with internet access, can pass through the support pole.

According to an exemplary embodiment, the support pole is provided with an access door. A control line may extend between the functional pole module and the access door, such that an operator can exchange control data for controlling the power and data interface and/or the wireless communication means via said control line.

In an embodiment, the support pole is provided with a plurality of access doors such that access to different kinds of lines by different operators can be discriminated.

In this manner, the operator can have access to some functionalities of the functional pole module from the ground, e.g. for configurating the functional unit of the functional pole module.

According to a preferred embodiment, the functional pole module further comprises one or more power lines extending through an opening in the lower section. The one or more power lines may be configured for being connected to a mains power supply, or to a DC power supply.

A power line extending through the opening in the lower section may be for powering the functional unit of the functional pole module or may be for powering another functional unit of another functional pole module located above.

The power line may be connected through the opening in the lower section using an electrical connector, e.g. plug, harness. The power line may also extend through an opening in the upper section and may be connected using an electrical connector, e.g. plug, harness. There may be more than one power line extending and being connected via the upper section and/or the lower section. For example, lines which are reaching the top of the modular post can be accessed from one or more access doors in the support pole, said lines being connected between all multiple pole modules via a series of electrical connectors. For the network connection, there may be an individual line running from each of the selected functional units to the support pole.

In an embodiment, the functional pole module may be supplied in power by a 24V DC-bus power line extending through the opening in the lower section. A 230V mains power line may also extend through openings in the lower and upper sections to be connected to another functional pole module located above.

According to an exemplary embodiment, the modular post further comprises a base support pivotably coupled to the middle section. At least an antenna of the wireless communication means is provided to the base support, such that the antenna can be oriented in a plurality of directions with respect to the middle section.

Preferably, the base support is pivotable around an axis substantially perpendicular to the central axis. The antenna may thus be oriented in a three-dimensional manner. Indeed, the 360° rotation range of the functional pole module coupled with the tilting range of the base support allows accurately aiming the direction of the antenna.

In this way, an optimized position for the antenna can be reached for its transmission and/or reception of signals. Preferably, the entire wireless communication means is provided to the base support.

According to a preferred embodiment, the wireless communication means comprises a directional antenna. Preferably, the directional antenna is a line-of-sight antenna.

According to an exemplary embodiment, the middle section comprises a removable cover delimiting a sealed compartment of the functional pole module. The removable cover is configured for being transparent to signals received and/or transmitted by the functional pole module.

In this manner, the functional unit is protected against water ingress and can be easily accessed for maintenance by removing the removable cover. A gasket may be used between the removable cover and the rest of the functional pole module to ensure tightness.

According to an exemplary embodiment, the middle section comprises a rigid frame, e.g. an integral core housing, between the lower and upper section, a removable peripheral wall portion and a fixed peripheral wall portion, said removable and fixed peripheral wall portions delimiting a compartment in which the functional unit is arranged. The removable peripheral wall portion provides access to the compartment. The removable and fixed peripheral wall portions may be fixed to the rigid frame. Typically the removable wall portion will extend over a smaller part of the periphery than the fixed wall portion. Preferably one of the peripheral wall portions, more preferably the removable wall portion, is made of a material such as a plastic transparent to signals transmitted or received by the wireless communication means, while the other one may be made of a more rigid material such as a metal material.

Optionally, there is provided a support plate in the compartment delimited by the removable and fixed peripheral wall portion. Preferably, the support plate is fixed to the rigid frame. Preferably, the support plate is arranged substantially vertically, near an interface between the removable and the fixed peripheral wall portion. The functional unit or a portion thereof may be mounted on a side the support plate which is accessible when the removable peripheral wall portion is removed, and another component and/or another part of the functional unit may be provided in the space behind the support plate, i.e. in a space between the support plate and the fixed peripheral wall portion.

Preferably, the upper section of the housing is connected to the lower section by means of multiple rods extending in the housing at a distance of the central axis and at a regular distance from each other. Such rods extend between the lower and upper section to give mechanical strength to the functional pole module. In that manner the weight may be carried at least partially by the rods instead of being carried by the middle section of the housing. Preferably, the rods are made of metal. The rods are preferably solid rods, but may also be hollow rods.

In another embodiment, the upper section is connected to the lower section by means of a single central rod extending along the central axis. Such central rod extends between the lower and upper section to give mechanical strength to the module. In that manner the weight may be carried at least partially by the central rod instead of being carried by the middle section of the housing. Preferably, the rod is made of metal. The central rod is preferably a solid rod or a hollow rod.

If hollow, the multiple rods or the central rod may be used for passing one or more cables from the lower section to the upper section.

Preferably, the lower and upper sections are made of metal.

The functional pole module may further comprise a hollow core arranged in the housing between the lower and upper section, and the functional unit included in the functional pole module may be arranged inside and/or outside of the hollow core. The hollow core may be used to hide parts of the functional units and/or to hide various connection means, such as cable lines and electrical plugs, and/or to reduce reflection. To that end the hollow core may have an outer surface which is configured to reduce reflection, and which is preferably black. Optionally, the hollow core may provide additional mechanical strength to the functional pole module; however, typically the mechanical strength of the functional pole module is mainly achieved by the fixed peripheral wall portion or by the multiple rods or by the single central rod, depending on the embodiment. If present, the multiple rods may be arranged between the middle section and the hollow core. Alternatively or in addition, the multiple rods or a part thereof may be arranged inside the hollow core, i.e. the hollow core may also be arranged around at least a part of the multiple rods. If a single central rod is present, it may be arranged in the hollow core.

Optionally the hollow core may be provided with recesses to allow cables and/or other component parts to extend through the hollow core. The hollow core may have an outer surface with concave, outwardly protruding parts and convex inwardly protruding parts, wherein e.g. multiple recesses are arranged in the concave, outwardly protruding parts and wherein between each pair of concave, outwardly protruding parts there is a convex inwardly protruding part. Optionally, the multiple rods may be arranged adjacent the convex inwardly protruding parts.

Exemplary embodiments of such a structure are disclosed in PCT/EP2020/082269 which is included herein by reference. In this application the functional pole module comprises multiple functional units mounted on brackets, but the skilled persons understands that a similar structure can be used with one or more functional units mounted on a different kind of support.

According to a preferred embodiment, the wireless communication means comprises a terminal unit configured for transmitting and/or receiving signals to/from a base unit.

The base unit may be connected to the network connection and have access to the internet. The terminal unit may be configured for receiving an internet signal from the base unit. The terminal unit may also be configured for receiving data from the another functional unit, e.g. a camera unit, and to relay this data to the base unit.

The base unit may transmit the internet signal to the terminal unit. Additionally, the base unit may receive data from the another functional unit through the terminal unit. In an embodiment, the base unit may be configured for transmitting the internet signal in a 90°-range to multiple terminal units arranged in different modular posts.

According to an exemplary embodiment, the plurality of pole modules comprises a base pole module including a base unit.

In an embodiment, the modular post comprises both a terminal unit and a base unit and can act as part of a daisy-chain like network of modular posts, i.e. a network operating in a linear mode. In another embodiment, the modular post comprises a base unit and no terminal unit and can act as an anchor point for one or more remote terminal units within range.

Additionally, the base unit may be connected to the network connection and have access to the internet.

According to a preferred embodiment, the plurality of pole modules comprises a processing pole module, said processing pole module comprising a processing means configured to receive data from the another functional unit, and to process said received data.

In an exemplary embodiment, the processing pole module comprises a processing means configured to receive sensed data, e.g. image data, from one or more other functional units, e.g. a camera unit, and to process said sensed data. The processing pole module may be formed as a module with a housing having a rigid frame, e.g. an integral core housing, for accommodating the processing means, said housing including a lower and upper section with a coupling interface. The integral core may be surrounded by a fixed peripheral wall portion and a removable peripheral wall portion, e.g. a removable cover. For example, the housing may comprise a removable cylindrical or prism-shaped shell to provide access to the processing means. Further, one or more electrical plugs may be provided in the processing pole module, e.g. an electrical plug for interconnecting power lines for powering one or more light pole modules of the modular post, and/or one or more electrical plugs for connecting lines to other units.

In an embodiment, the processing means may be powered by a power line, e.g. a 24V DC-bus, and may transmit data to a terminal unit via a data line, e.g. an Ethernet cable.

In a preferred embodiment, the lower section of the functional pole module is provided with an interface formed at an end thereof, said interface being configured for engaging with a complementary interface of a lower pole module. Further, one or more external or internal module connectors may be provided for connecting the complementary interfaces. Preferably, the module connector has a surface shaped to be complementary to a shaped portion formed by the engaged complementary interfaces. Preferably, the internal or external module connector is configured to apply pressure in a first direction when the module connector is tightened against the engaged complementary interfaces. Preferably, the internal or external module connector is configured to convert the pressure applied in the first direction to a clamping pressure in a second direction, the second direction being substantially perpendicular to the first direction.

According to an exemplary embodiment, the lower section of the functional pole module is provided with a lower round end portion, and is connected to one of the plurality of pole modules through a pole connector comprising a first round connector portion and a second round connector portion which together surround the round end portion of the lower section and an adjacent round end portion of said one pole module. In other embodiments, other coupling interfaces may be used, such as coupling interfaces with polygonal connector portions. It is noted that a similar embodiment may be provided with internal module connectors instead of external module connectors in order to clamp the functional pole module to the lower pole module below.

In an exemplary embodiment, any adjacent pole modules of the plurality of pole modules may be interconnected through a module connector as described above. If a support pole is present, the lowest pole module of the plurality of pole modules may be connected to the support pole through a module connector, e.g. a connector as described above. The module connector may have an outer diameter which is substantially the same as an outer diameter of the support pole. The support pole and the middle section of the functional pole module may have an outer diameter which is substantially the same.

According to a preferred embodiment, the processing pole module is arranged below the functional pole module and the another functional pole module. The processing pole module has an upper section which is connected to the lower section of the functional pole module or of the another functional pole module, and a lower section which is connected to another lower pole module of the plurality of pole modules through one or more module connectors.

In an alternative embodiment, the processing pole module is arranged above the functional pole module, and the processing pole module has a lower section which is connected to the upper section of the functional pole module, and an upper section which is connected to another higher pole module of the plurality of pole modules or to a cover module through one or more module connectors.

In other embodiments, additional pole modules could be positioned between the functional pole module and the processing pole module.

According to an exemplary embodiment the plurality of pole modules are pole modules as disclosed in EP 3 076 073 B1 which is included herein by reference. By using pole module connectors as disclosed in EP 3 076 073 B1 with two connector portions which can be clamped around round end parts of the pole modules, a pole module can be rotated around the axial direction of the support pole in the desired position and then fixed by the connector portions.

According to an exemplary embodiment, the middle section, the upper section, and the lower section have substantially the same outer perimeter.

According to a preferred embodiment, the wireless communication means is configured for millimeter-wave communication, preferably in a 57-65 GHz range.

Preferably, the wireless communication means is configured for 5G communications.

According to an exemplary embodiment, the plurality of pole modules comprises a light pole module comprising a light source. The light source included in a light pole module may comprise a plurality of light emitting diodes, e.g. an array of light emitting diodes, which may be arranged on a PCB. Further, a driver for driving the plurality of light emitting diodes, optionally in combination with a dimmer may be integrated in the modular post in any known manner.

Examples of functional components which may be included in a pole module or in a housing attached to an external surface of a support pole of the lamp post, are any one or more of the following:

- power management circuitry, preferably power management circuitry configured to manage the provision of power to multiple lamp posts, preferably at least three lamp posts, e.g. more than ten lamp posts. In such embodiments power connection cables pass from the pole module through the support pole to other lamp posts, e.g. underground;
- telecommunication circuitry, such as base station circuitry;
- audio system management circuitry;
- a display;
- an antenna;
- WiFi circuitry, wherein an antenna for receiving WiFi signals may be integrated either in the pole module or in a separate antenna module;

charger circuitry, e.g. phone charger circuitry or vehicle charger circuitry;

an environmental sensor such as a microphone, or a detector of $CO_2$, $NO_x$, smoke, etc., and the associated circuitry;

a human interface device (HID) and the associated circuitry, e.g. a camera, a loudspeaker, a button, a touch screen, etc.

repeater circuitry, e.g. a WiFi repeater;

a radar sensor;

a sign, such as a publicity banner;

a water discharge device, such as a shower head, a sprinkler, a water sprayer, etc;

a trash bin;

a socket, such as an electrical socket.

According to another aspect, there is provided a functional pole module for use in a modular post of any one of the above described embodiments. The functional pole module may be provided with any one of the features described above.

According to a second aspect of the invention, there is provided a modular post comprising a plurality of pole modules arranged one above the other along a central axis of the lamp post. The plurality of pole modules comprises a functional pole module. The functional pole module comprises a housing comprising a lower section, a middle section, and an upper section. The middle section comprises a support plate carrying a functional unit, said support plate delimiting a sealed compartment of the functional pole module. The functional pole module also comprises a cable gland provided to the support plate, and a cable passes from the functional unit to the sealed compartment via the cable gland. The lower section comprises a coupling interface configured for mechanically coupling the functional pole module to another pole module of the plurality of pole modules located below along the central axis. Additionally or alternatively, the upper section comprises a coupling interface configured for mechanically coupling the functional pole module to another pole module of the plurality of pole modules located above along the central axis. The lower section and the upper section are configured such that the functional pole module can be rotated around the central axis.

By having a cable gland provided to the support plate, and with the support plate delimiting a sealed compartment, tightness between the functional unit and the sealed compartment is preserved. At the same time, the functional pole module can still be rotated. So, there is still flexibility in positioning the functional pole module to a desired orientation. The cable gland may be positioned next to or behind the functional unit. One or more cable lines, e.g. power line, data line, control line, may pass through the cable gland from the functional unit to the sealed compartment. The support plate, preferably made of aluminum or plastic such as polycarbonate, may be provided to an opening in a side portion of the middle section of the housing. A gasket arranged around the opening between the support plate and the housing prevents water ingress.

According to an exemplary embodiment, the middle section comprises a rigid frame between the lower and upper section, a peripheral wall portion, and the support plate, wherein the support plate and the peripheral wall portion delimit the sealed compartment. The support plate and the peripheral wall portion may be fixed to the frame in a sealed manner. Typically the wall portion, e.g. a cylindrical shell, will extend over at least 150°, more preferably at least 180°.

According to an exemplary embodiment, the functional pole module further comprises a functional unit including a camera unit.

According to a preferred embodiment, the functional pole module further comprises a functional unit including a wireless communication means.

In an embodiment, there may be a modular post comprising both the functional pole module comprising a functional unit including a wireless communication means and another functional pole module comprising a functional unit including a camera unit as described above.

The functional pole module may be provided with any one of the features described above.

According to another aspect, there is provided a network of modular posts. The network is characterised by a plurality of modular posts according to any one of the embodiments described above with a terminal unit. Each terminal unit of the plurality of modular posts is configured for transmitting and/or receiving signals to/from the same base unit connected to a network connection.

In this manner, the network may be organized in a star configuration with each antenna of the terminal units facing the base unit.

According to an exemplary embodiment, the base unit is included in a modular post according to any one of the embodiments disclosed above.

According to yet another aspect, there is provided a network of modular posts. The network of modular posts is characterized by a plurality of modular posts according to any one of the embodiments disclosed above with a terminal unit and an end modular post. Each of the plurality of modular posts further comprises a base pole module including a base unit, and the end modular post comprises an end base unit connected to the internet. Each terminal unit of a modular post of the plurality of modular posts is configured for receiving wireless signals, from the base unit of an adjacent modular post of the plurality of modular posts and for transmitting signals from the another pole module to the base unit of its own modular post, preferably in a non-wireless manner. The base unit is configured for transmitting the data received from the terminal unit wirelessly to a terminal unit of an adjacent modular post. The end base unit of the end modular post is configured to transmit signals received from a base unit of an adjacent modular post to the internet, and to transmit data from the internet wirelessly to a terminal unit of an adjacent modular post.

In this way, the network may be organized in a daisy-chain organization with each antenna of the base unit facing a base unit of a previous modular post in the chain and each antenna of a terminal unit facing a base unit of a next modular post in the chain. In that way, the antennas may have a limited range, e.g. a range of less than 180°, or even less than 120°.

According to an exemplary embodiment, the end base unit is included in a modular post according to any one of the previous embodiments.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
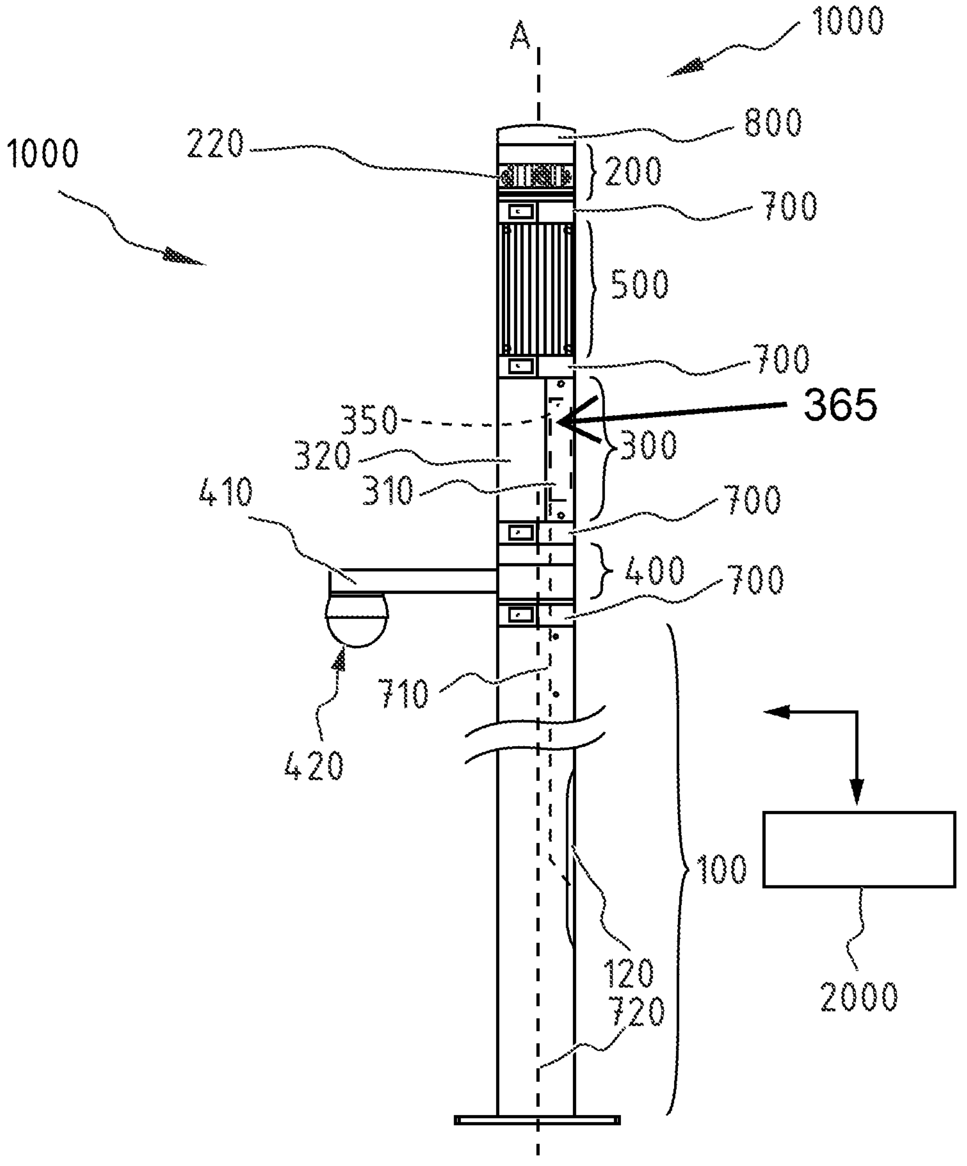
FIG. 1 illustrates schematically an exemplary embodiment of a modular post.

FIG. 1 illustrates schematically an exemplary embodiment of a modular post according to the present invention.

The modular post 1000 comprises a plurality of pole modules 200, 300, 400, 500 arranged one above the other along a central axis A of the modular post 1000. The plurality of pole modules 200, 300, 400, 500 comprises a functional pole module 300 for receiving and/or transmitting signals. The pole modules 200, 300, 400, 500 may be arranged in any order one above the other along the central axis A of the modular post 1000, and may be connected to the support pole 100 and to each other in any suitable way, e.g. using module connectors such as pole module connectors 700 as described in EP 3 076 073 B1 in the name of the applicant.

The modular post 1000, preferably a lamp post, comprises a support pole 100 and the plurality of pole modules 200, 300, 400, 500 may be supported by the support pole 100. The plurality of pole modules 200, 300, 400, 500 comprises a camera pole module 200, the functional pole module 300 comprising a functional unit 350 with the wireless communication means 351 for receiving and/or transmitting signals wirelessly, another functional pole module 400 with a bracket 410, e.g. another camera pole module with a camera unit 420 fixed to the bracket 410 or a light pole module with a light source 420 fixed to the bracket 410, and processing pole module 500, e.g. an image processing pole module. Other functionalities may be included in one or more other optional functional pole modules, see also the list provided above in the summary. The wireless communication means 351 may be configured for millimeter-wave communication, preferably for 5G communications.

Figure 3A:
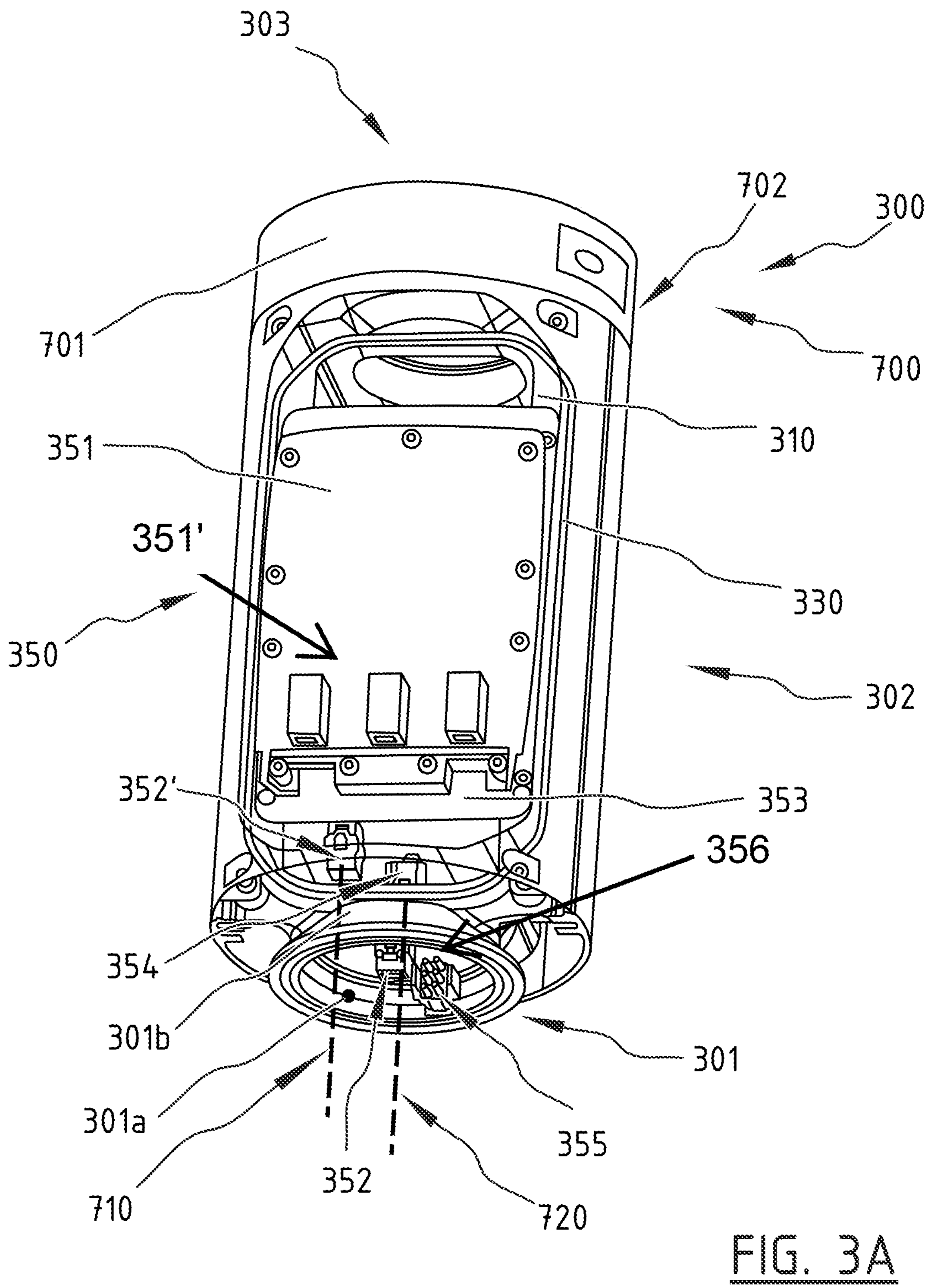
FIGS. 3A-3B show a perspective view and an exploded view, respectively, of exemplary embodiments of a functional pole module.
Figure 3B:
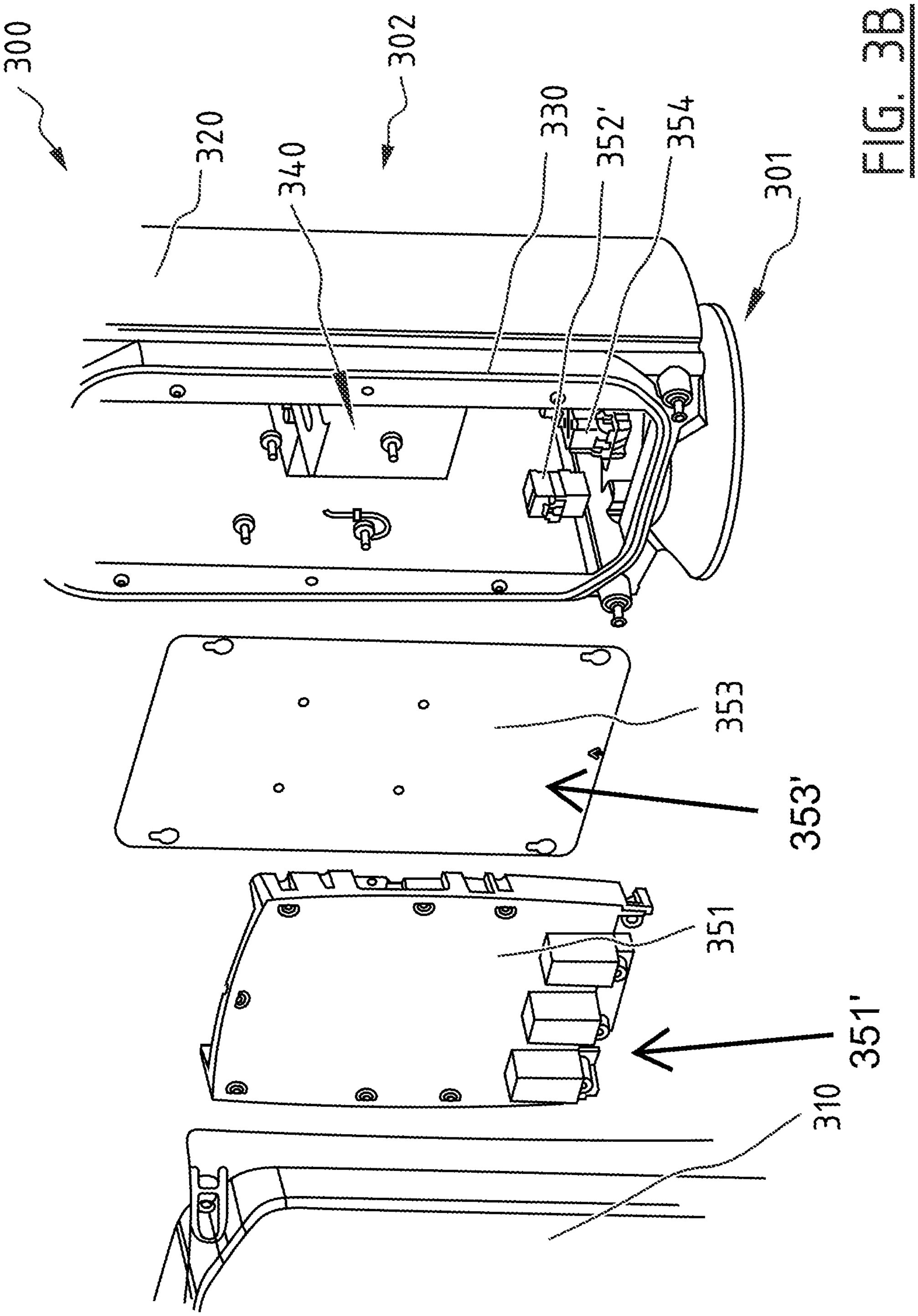

FIGS. 3A-3B illustrate more in details the architecture of the functional pole module 300 comprising the wireless communication means 351. As will be described more in details with reference to FIGS. 3A-3B, the functional pole module 300 may comprise a power and data interface configured for being connected to a power source and to the wireless communication means, for powering the wireless communication means 351, for powering another functional unit of another functional pole module 200, 400, 500, and for transmitting and/or receiving data to/from the another functional unit.

In the embodiment of FIG. 1, the plurality of pole modules 200, 300, 400, 500 may be connected using pole module connectors 700 each comprising two connector portions 701, 702 which can be clamped around round end parts of adjacent functional pole modules. Such module connectors 700 may be used for all pole modules. Using such pole module connectors, a pole module 200, 300, 400, 500 can be rotated around the central axis A of the modular post in a desired position and then fixed by the connector portions 701, 702 and a fixation means for coupling the two connector portions 701, 702 to each other around round end parts of adjacent functional pole modules to be connected. Also the connection between a pole module and the support pole 100 can be done in the same way. Each pole module 200, 300, 400, 500 can be mounted in a tight manner to another pole module or to the support pole 100. In other non-illustrated embodiments, the pole modules may be connected in a different manner, e.g. as described above in the summary, e.g. using internal connector portions instead of external connector portions 701, 702. Further, the pole modules 200, 300, 400, 500 are shown to have a cylindrical outer surface but the skilled person understands that the pole modules may have a different shape, e.g. a prism shaped outer surface.

The support pole 100 may be provided with an access door 120. A control line 710 may extend between the functional pole module 300 and the access door 120, such that an operator can exchange control data for controlling the power and data interface and/or the wireless communication means 351 via said control line 710. In the embodiment of FIG. 1, the functional pole module 300 may also further comprises a power line 720 extending through an opening in a lower section of the functional pole module housing. The power line 720 may also be connected to a mains power supply. In an alternative embodiment, there may be one or more power lines. In yet another embodiment, the power line may be configured for being connected to a DC power supply.

The power line 720 extending through the opening may be for powering the functional unit of the functional pole module and/or may be for powering another functional pole module located above.

The power line 720 may be connected through the opening in the lower section using an electrical connector, e.g. plug, harness. The power line 720 may also extend through an opening in an upper section of the housing and connected using an electrical connector, e.g. plug, harness. There may be more than one power line extending and being connected via the upper section and/or the lower section. Cable lines which are reaching the top of the modular post can be accessed from one or more access doors 120 in the support pole 100, said lines being connected between all multiple pole modules 200, 300, 400, 500 via a series of electrical connectors. For the network connection, there may be an individual line (not shown) running from each of the selected functional units to the support pole. In an embodiment, the functional pole module 300 may be supplied in power by a 24V DC-bus power line extending through the opening in the lower section. A 230V mains power line 720 may also be extending through the opening in the lower section to be connected to another functional pole module located above.

The housing of the functional pole module 300 may comprise a removable cover 310 delimiting a sealed compartment 365 of the functional pole module. The removable cover 310 may be configured for being transparent to signals received and/or transmitted by the functional pole module 300. A gasket may be used between the removable cover 310 and the rest of the functional pole module 300 to ensure tightness.

Embodiments of the invention also relate to a network comprising a plurality of modular posts 1000 (see FIG. 8) according to any one of the previous embodiments, and a remote management subsystem 2000 configured to receive the raw or processed data from the plurality of modular posts 1000 and/or to send audio and/or video and/or alarm data, for example, to said plurality of modular posts 1000, e.g. data to be output by an intercom interface. The skilled person will understand that the kind of data that can be received and/or transmitted by the remote management subsystem is not limited to the above list. When the modular posts are located near a parking, the remote management subsystem 2000 may be configured to extract useful information, such as parking space information or traffic information from the received data. Also when certain events are derived from the received data, the remote management subsystem 2000 may send e.g. alarm messages to the modular post or to another server in reaction to the detection of certain events. When an alarm message is sent to a modular post 1000, the modular post 1000 may output an alarm, e.g. an audio alarm, a light alarm (e.g. red light), a video alarm, etc.

Figure 2:
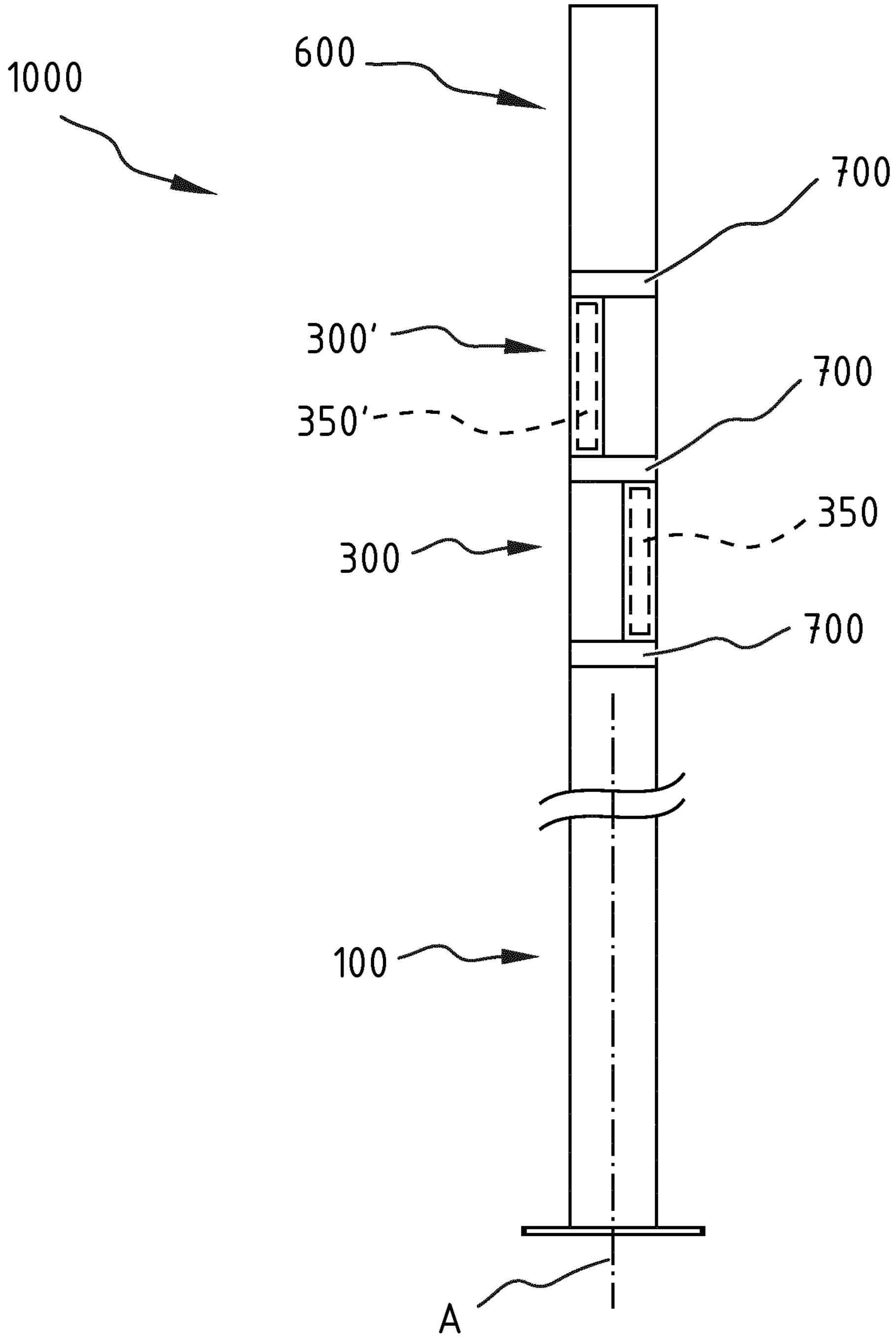
FIG. 2 illustrates schematically another exemplary embodiment of a modular post.

FIG. 2 illustrates schematically another exemplary embodiment of a modular post according to the present invention.

The modular post 1000 comprises a plurality of pole modules 300, 300', 600 arranged one above the other along a central axis A of the modular post 1000. The plurality of pole modules 300, 300', 600 comprises a functional pole module 300 for receiving and/or transmitting signals. The pole modules 300, 300', 600 may be arranged in any order one above the other along the central axis A of the modular post 1000, and may be connected to the support pole 100 and to each other in any suitable way. The modular post 1000, preferably a lamp post, comprises a support pole 100 and the plurality of pole modules 300, 300', 600 may be supported by the support pole 100. The plurality of pole modules comprises the functional pole module 300 comprising the wireless communication means 351 for receiving and/or transmitting signals wirelessly as described above, another functional pole module 300', and a light pole module 600. As will be described more in details with reference to FIGS. 3A-3B, the functional pole module 300 may comprise a power and data interface configured for being connected to a power source and to the wireless communication means 351, for powering the light unit of the light pole module 600, and for transmitting and/or receiving data to/from the light unit.

The wireless communication means 351 may be a terminal unit configured for transmitting and/or receiving signals to/from a base unit. The plurality of pole modules may comprise a base pole module 300' including the base unit 350'. In an embodiment, the base unit may be connected to a network connection and access the internet; and the terminal unit 350 may be configured for receiving an internet signal from the base unit 350'. The terminal unit 350 may also be configured for transmitting and/or receiving data to/from the another functional unit, e.g. the light unit of the light pole module 600, and to relay data to and/or from the base unit 350' to configure the light pole module 600 remotely for example. In an embodiment, the base unit 350' may be configured for transmitting the internet signal in a 90°-range to multiple terminal units arranged in different modular posts; similarly, the terminal unit 350 may be configured for communicating with the base unit in a 90°-range.

In another embodiment, the modular post 1000 comprises both a terminal unit 350 and a base unit 350' and can act as part of a daisy-chain like network of modular posts 1000. In yet another embodiment, the modular post 1000 comprises a base unit 350' and no terminal unit 350 and can act as an anchor point for one or more remote terminal unit within range. In still another embodiment, both pole modules below the light pole module are functional pole modules comprising a terminal unit.

Figure 4:
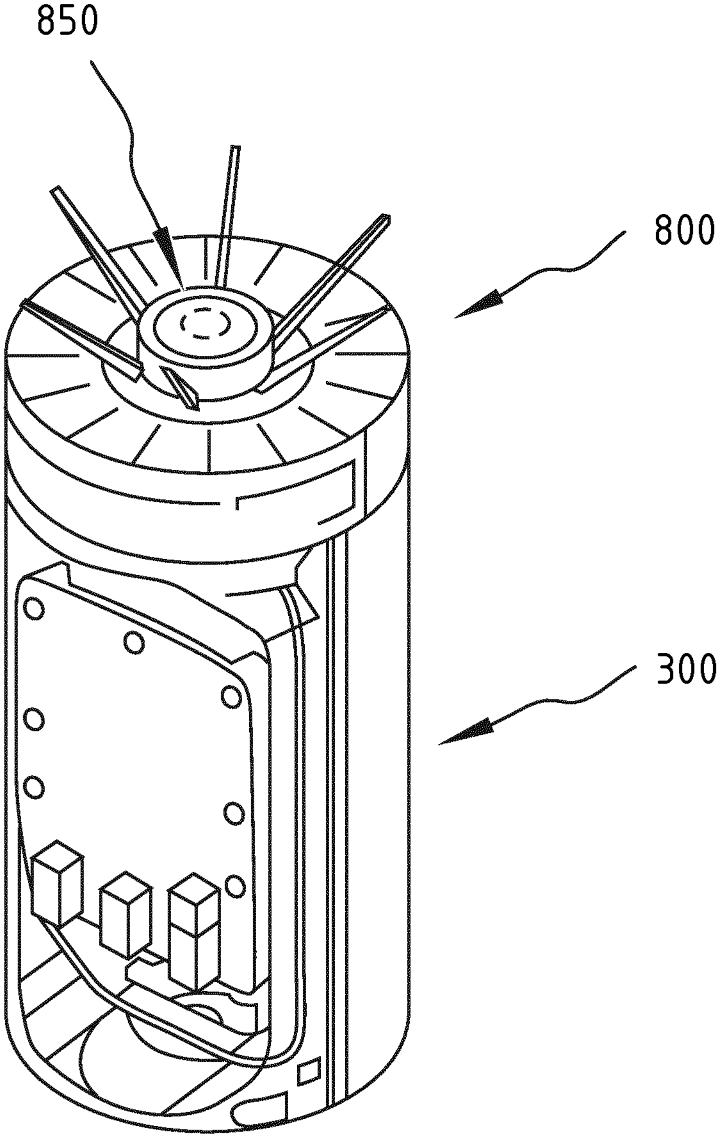
FIG. 4 shows a perspective view of another exemplary embodiment of a functional pole module.

FIGS. 3A-3B show a perspective view and an exploded view, respectively, of exemplary embodiments of a functional pole module according to the present invention. FIG. 4 shows a perspective view of another exemplary embodiment of a functional pole module according to the present invention. FIGS. 3A and 3B illustrate in detail a functional pole module 300. The functional pole module 300 comprises a wireless communication means 351 and a power and data interface 352. The power and data interface 352, 352', 354, 355 is configured for being connected to a power source and to the wireless communication means 351, for powering another functional unit (not shown) of another functional pole module (not shown), and for transmitting and/or receiving data to/from the another functional unit. The functional pole module 300 may be formed as a pole module with an integral core 320 for accommodating another component, a Power-over-Ethernet device 340 in the embodiment of FIG. 3B, said integral core 320 being part of a housing including a lower section 301, a middle section 302, and an upper section 303. The middle section 302 may be defined by the integral core 320 having a peripheral wall and completed by a removable cover 310, e.g. shaped as a removable cylindrical shell, to provide access to the wireless communication means 351. The peripheral wall of the integral core 320 of the functional pole module may have substantially the same outer diameter as the support pole (support pole 100 in FIG. 1).

The housing of the pole module 300 in FIGS. 3A-3B has its upper section 303 with a coupling interface configured for mechanically coupling the functional pole module 300 to another pole module located above along the central axis A. The coupling interface of the upper section 303 is provided with a round end portion (not shown) which is connected to a lower round end portion of the above-located another functional pole module. The housing of the pole module 300 in FIGS. 3A-3B has its lower section 301 with a coupling interface configured for mechanically coupling the functional pole module 300 to another pole module located below along the central axis A or to the support pole. The coupling interface of the lower section 301 is provided with a round end portion **301*b*** which is connected to an upper round end portion of the below-located another functional pole module or the support pole.

The power and data interface 352, 352', 354, 355 comprises a power input connector 355. In the embodiment of FIGS. 3A-3B, the power input connector 355 corresponds to a 6-pin connection plug connected to a DC line, e.g. a 24V DC-bus, which serves to power electrical components within the functional pole module 300. More particularly in the embodiments of FIGS. 3A-3B, the wireless communication means 351 is a terminal unit provided with a secondary power and data connector 352', and the functional pole module 300 comprises a Power-over-Ethernet device 340 powered via the power input connector 355 and which is configured for powering the terminal unit through the secondary power and data connector 352'. The secondary power and data connector 352' may be connected to a control line 710 extending from the functional pole module 300, such that an operator can exchange control data for controlling the power and data interface 352, 352', 354, 355 and/or the wireless communication means 351 via said control line 710.

The power and data interface 352, 352', 354, 355 also comprises a power and data connector 352 provided to the wireless communication means 351, e.g. a terminal unit, and extending through an opening 301*a* of the lower section. This power and data connector 352, e.g. an RJ45 plug, of the power and data interface may be connected to a power and data line running to the another functional unit of the another functional pole module. A mains and control connector 354 may also be provided through the opening 301*a* of the lower section.

The mains and control connector 354, e.g. a 9-pin connector in FIGS. 3A-3B, may be connected to a power line 720 running from the support pole or the lowest pole module through the modular post via intermediate pole modules and to the pole modules that need to be fed, typically at least to one or more light pole modules of the modular post. In addition, control instructions may be carried through the mains and control interface 354, typically for driving a light unit of the light pole module.

In addition, further plugs and lines may be provided for providing power to other units and carrying data.

FIG. 4 shows a perspective view of another exemplary embodiment of a functional pole module according to the present invention.

This functional pole module 300 may be similar to the embodiments described above. In the embodiment of FIG. 4, the functional pole module 300 may be a topmost functional pole module of a modular post and configured for being provided with a closed upper module 800 including a twist-lock socket 850, e.g. NEMA socket, for providing additional functionalities.

Figure 5:
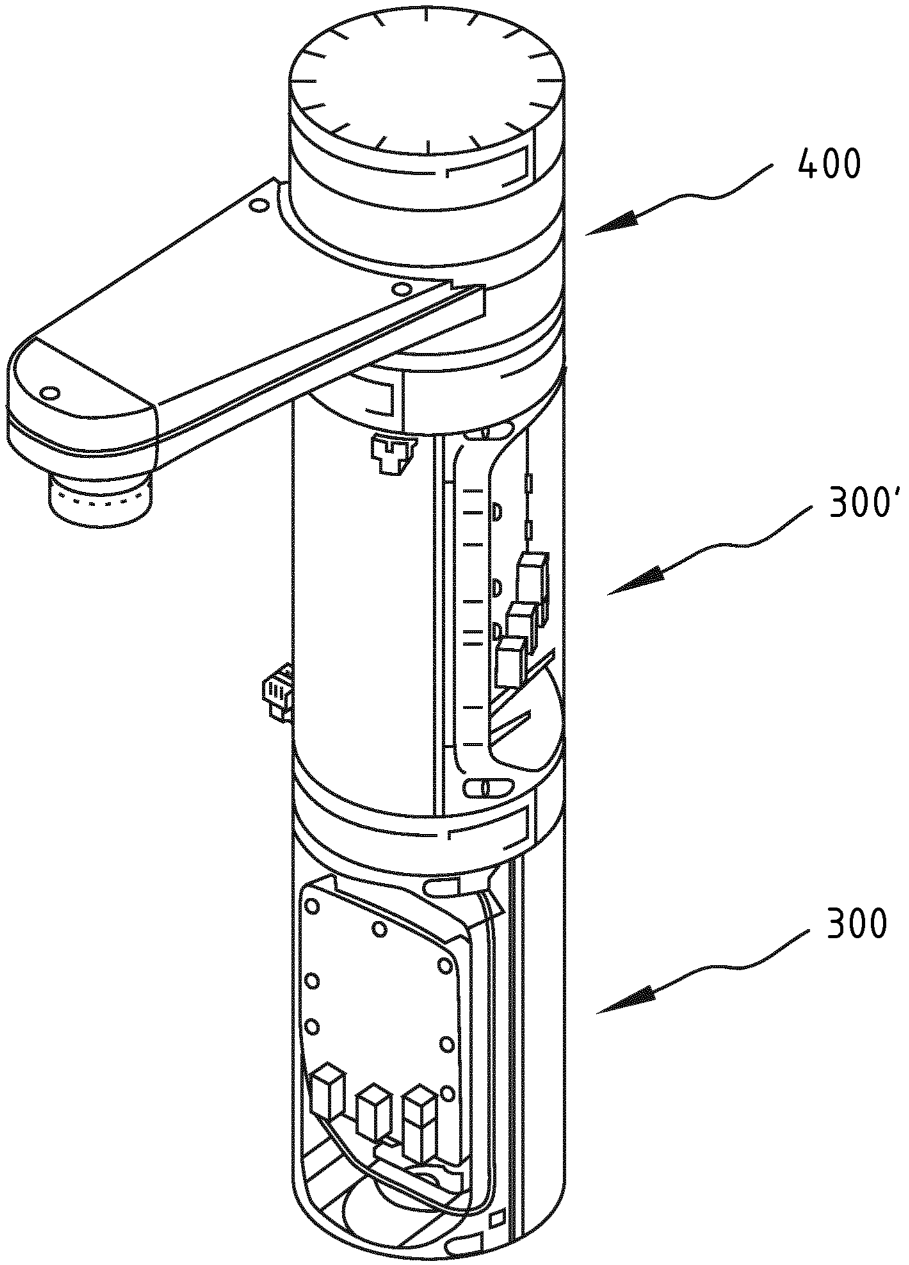
FIG. 5 depicts a perspective view of yet another exemplary embodiment of a modular post.

FIG. 5 depicts a perspective view of yet another exemplary embodiment of a modular post according to the present invention.

In the embodiment of FIG. 5, the modular post comprises three pole modules 300, 300', 400. The lowermost pole module 300 is the functional pole module comprising the wireless communication means. This wireless communication means is a terminal unit powered by a PoE device within the functional pole module 300. A power and data interface connects the functional pole module 300 and the topmost pole module 400 being a camera pole module with a bracket for mounting a camera unit. In an alternative embodiment, the topmost pole module 400 is a light pole module with a light unit mounted at the end of the bracket.

An upper section of the topmost pole module 400 may be a closed upper module. The modular post of FIG. 5 may be attached to a support such as a wall, and the functional pole module 300 may be a floating lowermost module.

The middle pole module 300' may be a second functional pole module comprising a second terminal unit also powered by a PoE device within the middle post module 300'. The functional pole module 300 may power the topmost module via the power and data interface. Sensed data by the camera unit of the topmost pole module 400 may be transmitted to the terminal unit of the functional pole module 300 via the power and data interface before being sent by the terminal unit to a remote base unit within range. Sensed data by the camera unit of the topmost module 400 may also be transmitted to the terminal unit of the middle pole module 400 via the another power and data interface. The remote base unit may be mounted in a modular post according to an exemplary embodiment of may be provided to another structure.

Figure 6:
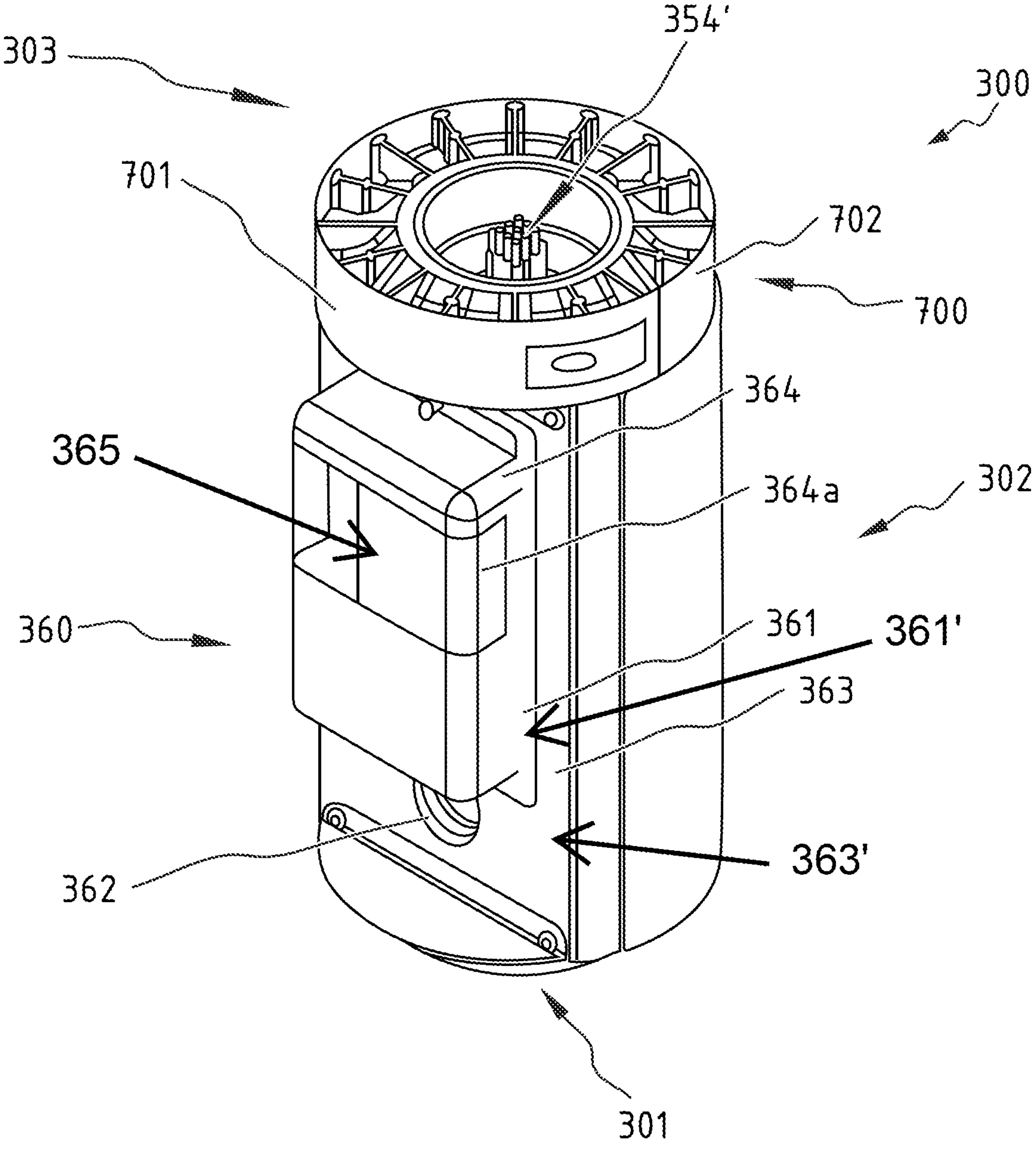
FIG. 6 shows a perspective view of yet another exemplary embodiment of a functional pole module.

FIG. 6 shows a perspective view of yet another exemplary embodiment of a functional pole module according to the present invention. The functional pole module may be a pole module of the plurality of pole modules included in a modular post, preferably a lamp post.

The functional pole module 300 comprises a housing comprising a lower section 301, a middle section 302, and an upper section 303. The middle section 303 comprises a support plate 363 carrying a functional unit 360. The support plate 363 is configured delimiting a sealed compartment 365 of the functional pole module 300. The support plate 363 may be made of metal, e.g. aluminum, or plastic, e.g. polycarbonate. The functional pole module 300 also comprises a cable gland 362 provided to the support plate 363, and a cable line (not shown) passes from the functional unit 360 to the sealed compartment 365 via the cable gland 362. The lower section 301 comprises a coupling interface (not shown) configured for mechanically coupling the functional pole module 300 to another pole module of the plurality of pole modules located below along a central axis of the modular post. Additionally or alternatively, the upper section 303 comprises a coupling interface 700 configured for mechanically coupling the functional pole module 300 to another pole module of the plurality of pole modules located above along the central axis. The lower section 301 and the upper section 303 are configured such that the functional pole module 300 can be rotated around the central axis.

The cable gland 362 may be positioned next to or behind the functional unit 360. One or more cable lines, e.g. power line, data line, control line, may pass through the cable gland 362 from the functional unit 360 to the sealed compartment. The support plate 363 may be provided to an opening in a side portion of the middle section 302 of the housing. A gasket (not shown) arranged around the opening between the support plate 363 and the housing prevents water ingress.

In an embodiment, the functional unit 350, 360 may comprise a wireless communication means 351, 361. The wireless communication means 351, 361 may be directly mounted to the support plate 353. 363. In an alternative embodiment, a tilting base 353', 363' may be provided to the support plate 353, 363 for mounting the wireless communication means 351, 361 thereon. The tilting base may be configured for pivoting around an axis substantially perpendicular to the central axis of the modular post. By tilting up or down, a direction of emission of an antenna 351', 361' included in the wireless communication means 351, 361 may be adjusted.

The wireless communication means 361 may be protected by a cover 364 provided over said wireless communication means 361. The cover 364 may be configured for preventing water ingress at the level of the wireless communication means 361 and to reach a desired level of tightness, e.g. IP66 rating. The cover 364 may comprise a signal window 364*a* in a material transparent to the signals transmitted and/or received by the wireless communication means 361. A mains and control connector 354', e.g. a 9-pin connector in FIGS. 3A-3B, may be connected to a power line (not shown) running from the support pole or the lowest pole module through the modular post via intermediate pole modules and to the pole modules that need to be fed, typically at least to one or more light pole modules of the modular post. The mains and control connector 354' may extend through an opening in the upper section 303 of the functional pole module 300.

The skilled person will understand that other functional units, e.g. camera unit, may be implemented following the same principles presented above.

Figure 7A:
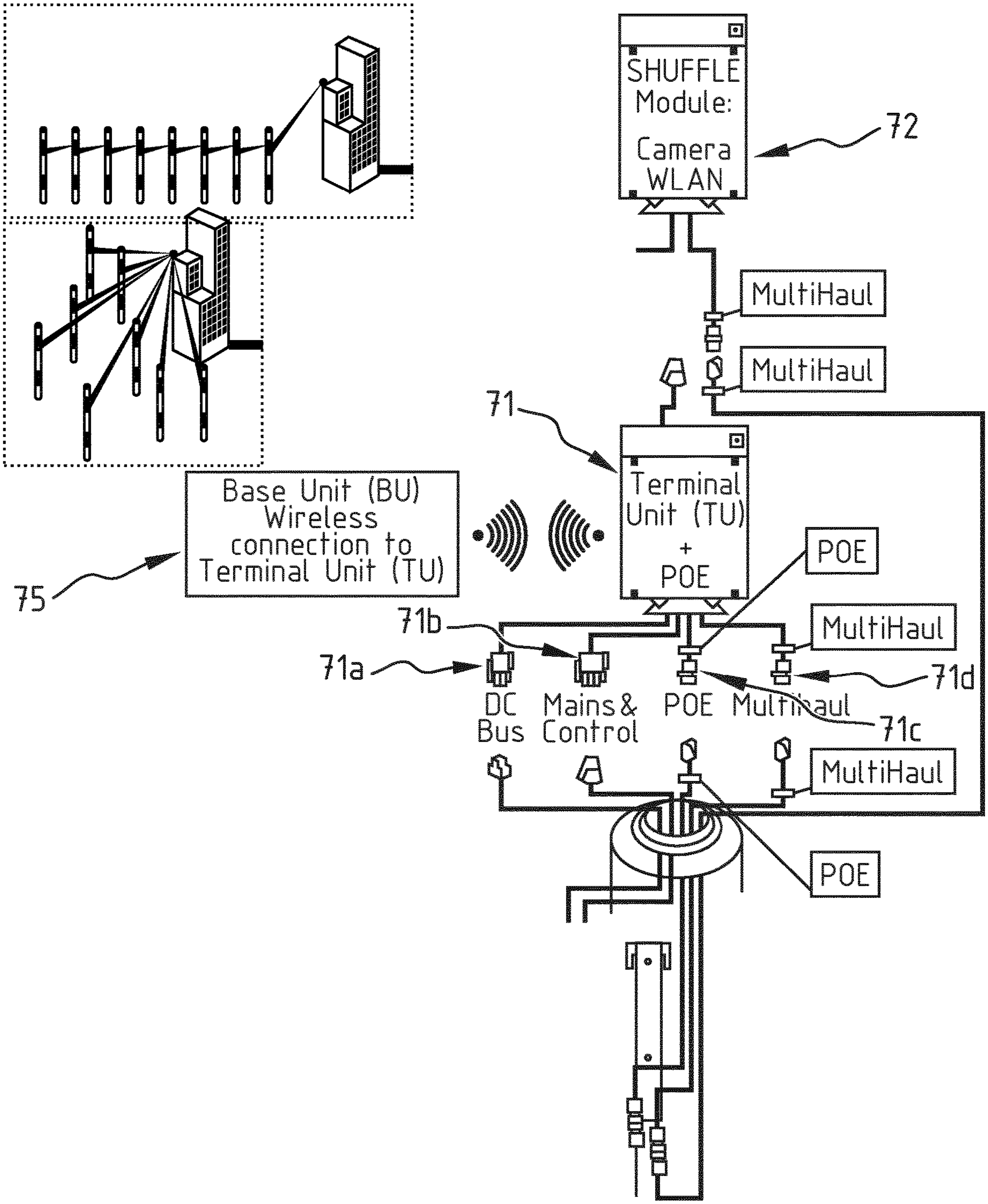
FIGS. 7A-7C represent other exemplary embodiments of schematical connections between pole modules of a modular post.
Figure 7B:
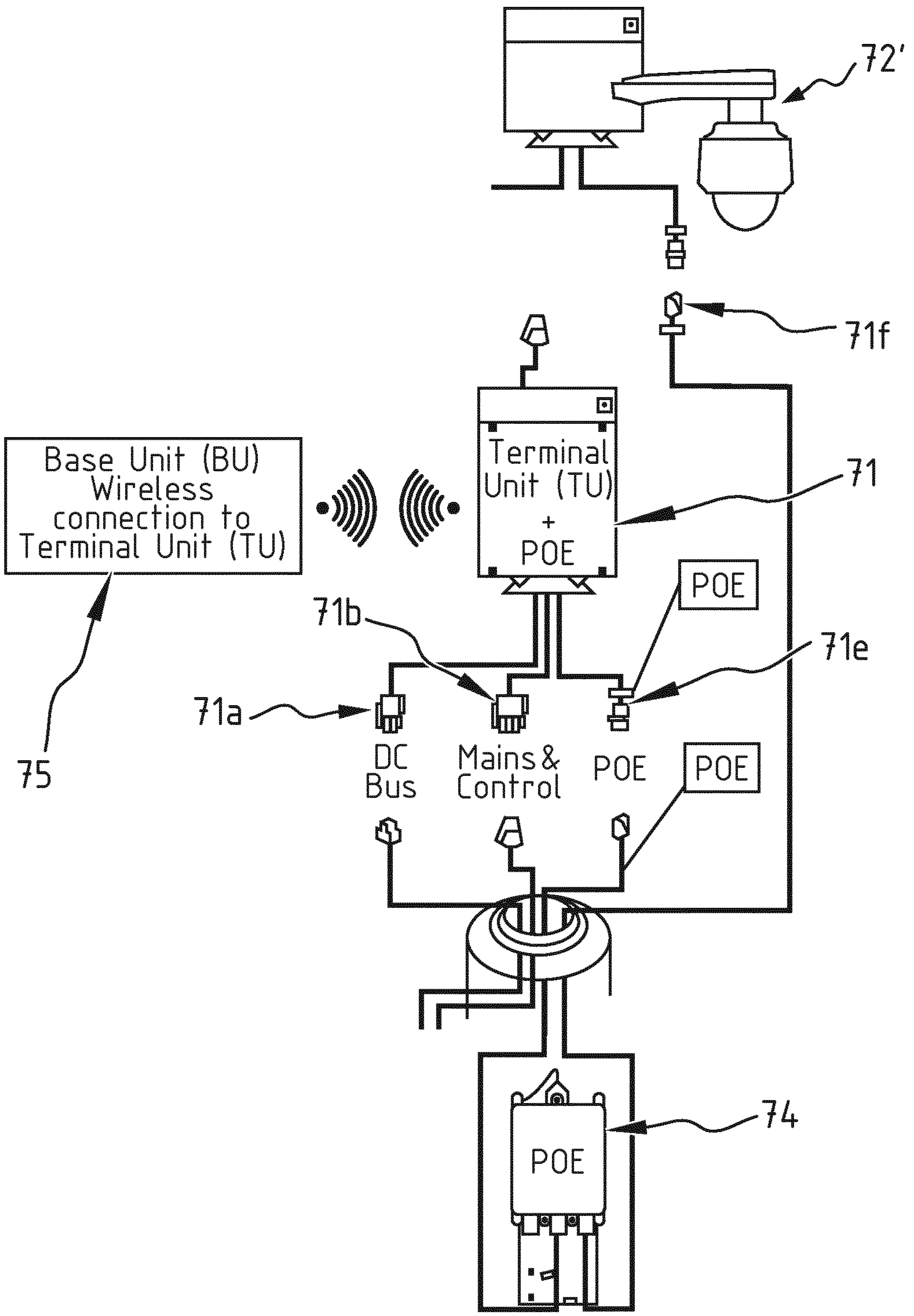
Figure 7C:
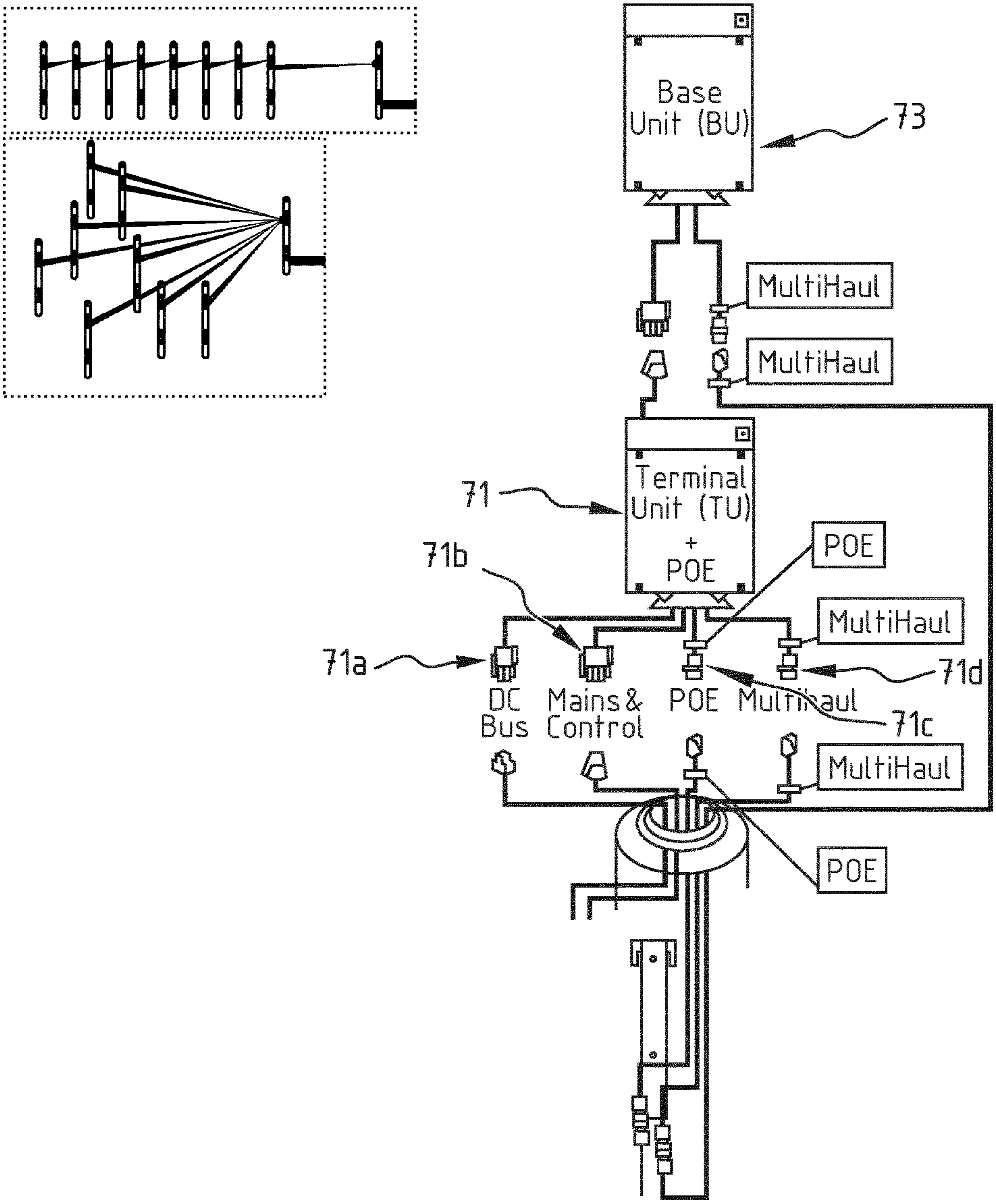

FIGS. 7A-7C represent other exemplary embodiments of schematical connections between pole modules of a modular post according to the present invention.

The pole modules of FIG. 7A are a functional pole module 71 comprising a terminal unit and a camera pole module 72. The functional pole module 71 may also comprise a Power-over-Ethernet device for powering the terminal unit. Multiple connectors 71*a*, 71*b*, 71*c*, 71*d* are provided as part of a power and data interface of the functional pole module 71 from and to the functional pole module 71 and the camera pole module 72. Firstly, a low power line may be connected to a low power connector 71*a* in order to power the PoE device of the functional pole module 71. Connection of the low power interface 71*a*, e.g. 24V DC-bus, may be done using a 6-pin plug. The PoE device may in turn power the terminal unit with an internal interface, e.g. an RJ45 plug, carrying both power and data. Configuration of the terminal unit and the PoE device may be achieved by an operator connecting to a data line connected to a data connector 71*c*, e.g. an RJ45 plug, and running to an access door in a support pole of the modular post. The functional pole module 71 may be connected to the camera pole module 72 via a power and data connector 71*d*, e.g. an RJ45 plug, configured for powering the camera unit of the camera pole module 72 and for transmitting and/or receiving data to/from the camera unit. Both the low power connector 71*a*, the power and data connector 71*d*, and the data connector 71*c* may extend through an opening of a lower section of the functional pole module 71. A mains and control connector 71*b* may also be provided through the opening of said lower section. A connection plug, e.g. a 9-pin connector, of the mains and control connector 71*b* may be connected to power lines running from the support pole or the lowest pole module through the modular post via intermediate pole modules and to the pole modules that need to be fed, typically at least to one or more light pole modules of the modular post. In addition, control instructions may be carried through the mains and control connector 71*b*, typically for driving a light unit of the light pole module. Therefore, the line connected to the mains and control connector 71*b* is floating within the functional pole module 71. The terminal unit of the functional pole module 71 can transmit data received from the camera unit of the camera pole module 72 to a remote base unit 75 within range.

In an alternative embodiment to FIG. 7A, a camera pole module 72' of the modular post may require more power than the one in FIG. 7A. This additional power need may be met by a secondary PoE device 74 provided to a support pole or to a lowermost pole module powered by a DC line; e.g. a 24 v DC-bus. Data may be carried via a data connector 71*e* of the terminal unit to and from the secondary PoE device 74. And the secondary PoE device 74 may be connected to the camera pole module 72' via a power and data connector 71*f*. The secondary PoE device 74 may be configure for powering the camera pole module 74, and for relaying data between the camera unit of the camera pole module 72' and the terminal unit of the functional pole module 71.

The pole modules of FIG. 7C are a functional pole module 71 comprising a terminal unit and a base pole module 73. The functional pole module 71 may also comprise a Power-over-Ethernet device for powering the terminal unit. Multiple connectors 71*a*, 71*b*, 71*c*, 71*d* are provided as part of a power and data interface from and to the functional pole module 71 and the base pole module 73. The natures of the connectors 71*a*, 71*b*, 71*c*, 71*d* are similar in FIG. 7C to the ones in FIG. 7A. The base unit of the base pole module 73 may be connected to the network connection and access the internet. In an alternative embodiment, the base unit may be relaying data from a remote terminal unit within range. The terminal unit of the functional pole module 71 may be configured for receiving an internet signal from the base unit of the base pole module 73. The terminal unit may then transmit data to a remote base unit within range. Additionally, the base unit may receive data from another functional unit of the modular post through the terminal unit.

Figure 8:
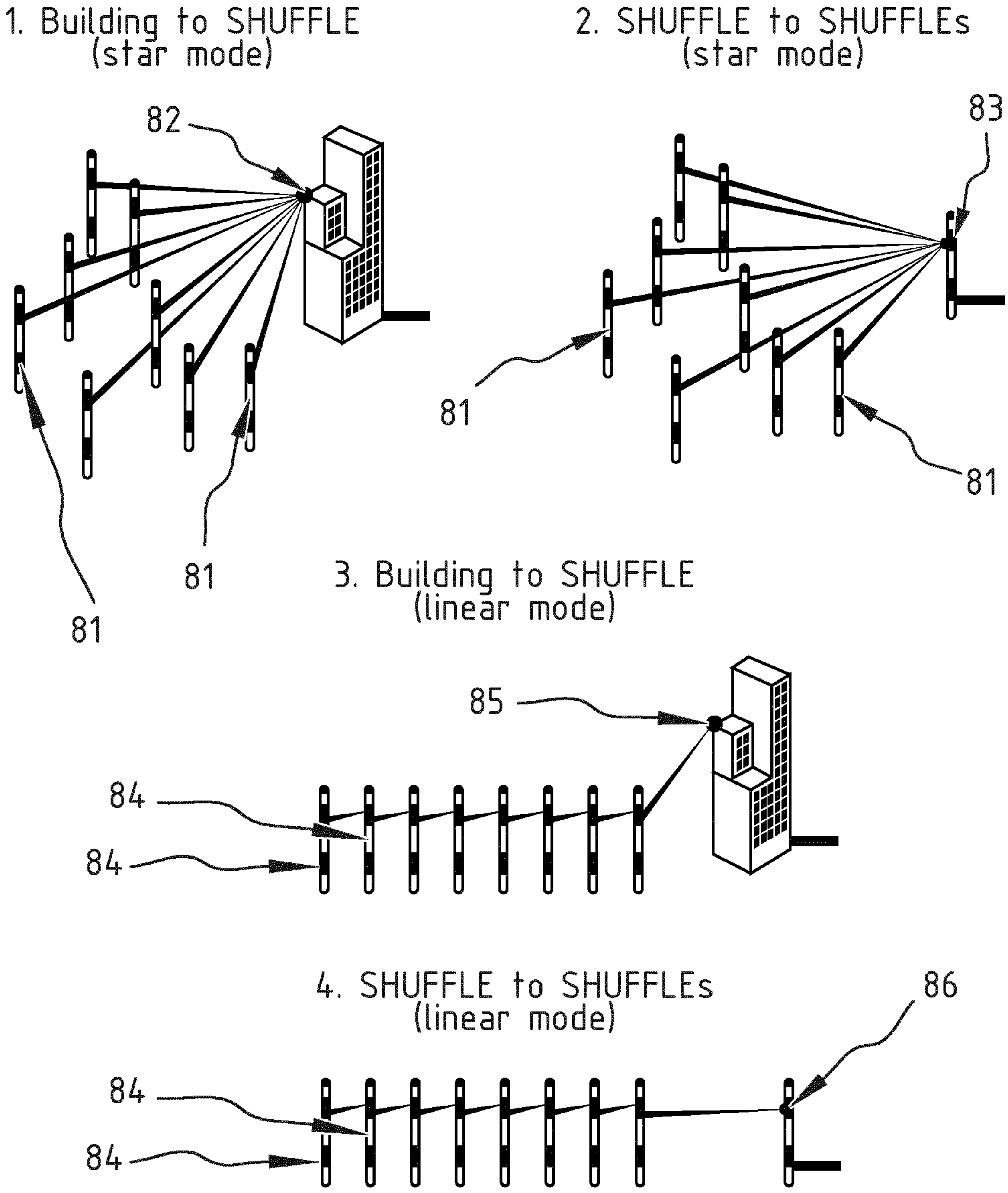
FIG. 8 shows exemplary embodiments of networks of modular posts.

FIG. 8 shows exemplary embodiments of networks of modular posts according to the present invention.

In FIG. 8-1, there is provided a network of modular posts 81. The network is characterised by a plurality of modular posts 81 according to exemplary embodiments of the invention. Each of the modular posts 81 comprises a functional pole module including a terminal unit. Each terminal unit of the plurality of modular posts 81 is configured for transmitting and/or receiving signals to/from the same end base unit 82 connected to a network connection having access to the internet. The network may be organized in a star configuration with each antenna of the terminal units facing a single end base unit 82. This end base unit 82 may be provided to a building.

In FIG. 8-2, the difference from FIG. 8-1, is that the network comprises a modular post 83 with a base pole module including the end base unit connected to a network connection having access to the internet. The other modular posts 81 of the plurality of modular posts have their terminal unit facing said end base unit of the modular post 83 with the base pole module.

In FIG. 8-4, there is provided a network of modular posts 84. The network of modular posts 84 is characterized by a plurality of modular posts 84 according to exemplary embodiments. Each of the modular posts 84 comprises a functional pole module including a terminal unit. Each of the plurality of modular posts 84 further comprises a base pole module including a base unit. The network of modular posts 84 also comprises an end base unit 85 connected to a network connection having access to the internet. Each terminal unit of the plurality of modular posts 84 is configured for transmitting and/or receiving signals to/from the base unit of the next modular post of the plurality of modular posts 84, the terminal unit of the last modular post of the plurality of modular posts 84 being configured for transmitting and/or receiving signals to/from the end base unit 85. The network may be organized in a daisy-chain organization, or in a linear mode, with each antenna of the terminal units facing the next base unit in the chain.

In FIG. 8-4, the difference from FIG. 8-3, is that the network comprises a modular post 86 with a base pole module including the end base unit connected to a network connection having access to the internet.

Whilst the principles of the invention have been set out above in connection with specific embodiments, it is to be understood that this description is merely made by way of example and not as a limitation of the scope of protection which is determined by the appended claims.

The invention claimed is:

1. A modular lamp post comprising a plurality of pole modules arranged one above the other along a central axis of the modular lamp post, said plurality of pole modules comprising a functional pole module for receiving and/or transmitting signals, said functional pole module comprising:

a housing comprising a lower section, a middle section, and an upper section; and a functional unit mounted in the middle section and comprising a wireless communication means and a power and data interface, said power and data interface configured for being connected to a power source and to the wireless communication means, for powering the wireless communication means, for powering another functional unit of another functional pole module, and for transmitting and/or receiving data to/from the other functional unit, wherein at least one of the lower section or the upper section comprises a coupling interface configured for mechanically coupling the functional pole module to another pole module of the plurality of pole modules located below or above along the central axis, respectively, wherein the middle section further comprises a support plate and a tilting base for pivotally mounting the wireless communication means, such that the wireless communication means can be oriented in a plurality of directions with respect to the middle section.

2. The modular lamp post according to claim 1, wherein the lower section, and/or optionally the upper section, is configured for allowing the functional pole module to be rotated about the central axis, and, optionally, for fixing a position of the function pole module relative to the central axis.

3. The modular lamp post according to claim 1, wherein the other functional unit comprises any one of the following: a sensing means, a communicating means such as a Wi-Fi access point or a base unit, a Human-Interface Device, a signaling means, or a processing means.

4. The modular lamp post according to claim 1, further comprising a support pole for supporting the plurality of pole modules.

5. The modular lamp post according to claim 1, further comprising one or more power lines extending through an opening in the lower section, said one or more power lines being optionally configured for being connected to a mains power supply or to a DC power supply.

6. The modular lamp post according to claim 1, wherein the wireless communication means comprises a directional antenna.

7. The modular lamp post according to claim 1, wherein the plurality of pole modules comprises a processing pole module, said processing pole module comprising a processing means configured to receive data from the other functional unit and to process said received data.

8. The modular lamp post according to claim 1, wherein the plurality of pole modules comprises a light pole module.

9. A functional pole module for use in the modular lamp post of claim 1.

10. The modular lamp post according to claim 1, wherein the other functional pole module comprises a camera pole module and the other functional unit of the camera pole module comprises a camera unit.

11. The modular lamp post according to claim 1, wherein the wireless communication means is powered by a Power-over-Ethernet, PoE, device having a power input receiving input power via a power line and having a PoE output connected to the wireless communication means.

12. The modular lamp post according to claim 1, wherein the middle section comprises a removable cover delimiting a sealed compartment of the functional pole module, and the removable cover is configured for being transparent to signals received and/or transmitted by the functional pole module.

13. The modular lamp post according to claim 1, wherein the wireless communication means is configured for millimeter-wave communication.

14. The modular lamp post according to claim 1, wherein the functional pole module is configured to control the powering of the another functional pole module.

15. The modular lamp post according to claim 1, wherein the power and data interface comprises a power input connector configured to be connected to a power line and a power and data connector configured to be connected to a power and data line for connecting the another functional pole module.

16. The modular lamp post according to claim 15, wherein the power and data interface comprises circuitry for powering the wireless communication means and the power and data connector, using the power on the power input line.

17. The modular lamp post according to claim 15, wherein the power and data interface is further configured for adapting the supplied power and data transmitted and/or received by the another functional unit to the another functional unit.

* * * * *